(12) United States Patent
Ishihara et al.

(10) Patent No.: US 6,819,091 B2
(45) Date of Patent: Nov. 16, 2004

(54) SWITCHING POWER SUPPLY APPARATUS WITH OVER-TEMPERATURE PROTECTION

(75) Inventors: Yutaka Ishihara, Tokyo (JP); Toru Takahashi, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 10/241,708

(22) Filed: Sep. 12, 2002

(65) Prior Publication Data

US 2003/0048097 A1 Mar. 13, 2003

(30) Foreign Application Priority Data

Sep. 13, 2001 (JP) ........................................ 2001-277732

(51) Int. Cl.[7] ................................................ G05F 1/56
(52) U.S. Cl. ........................ 323/285; 361/18; 361/103
(58) Field of Search ............................... 323/282, 285; 361/18, 103

(56) References Cited

U.S. PATENT DOCUMENTS

| | | | | | |
|---|---|---|---|---|---|
| 4,428,016 A | * | 1/1984 | Brasfield | ...................... | 361/18 |
| 4,692,688 A | * | 9/1987 | Stanojevic | .................. | 323/285 |
| 4,727,450 A | * | 2/1988 | Fachinetti et al. | ............. | 361/18 |
| 4,787,007 A | * | 11/1988 | Matsumura et al. | ........ | 361/103 |
| 4,937,697 A | * | 6/1990 | Edwards et al. | ............. | 323/285 |
| 5,453,904 A | * | 9/1995 | Higashiyama et al. | ........ | 361/94 |
| 6,005,761 A | * | 12/1999 | Izawa et al. | ................. | 361/103 |
| 6,140,806 A | * | 10/2000 | Gohara | ........................ | 323/282 |
| 6,297,623 B1 | * | 10/2001 | Balakrishnan et al. | ...... | 323/283 |
| 6,300,750 B1 | * | 10/2001 | Oglesbee et al. | ........... | 323/282 |
| 6,570,368 B2 | * | 5/2003 | Demizu | ...................... | 323/282 |

FOREIGN PATENT DOCUMENTS

JP          05-260735          10/1993

* cited by examiner

Primary Examiner—Jeffrey Sterrett
(74) Attorney, Agent, or Firm—Oblon, Spivak, McCleland, Maier & Neustadt, P.C.

(57) ABSTRACT

The present invention relates to a switching power supply apparatus equipped with an over-temperature protection circuit that operates appropriately even when a problem occurs in the control circuit. A switching conversion circuit 2 has a switching element 21 turned on and off according to a drive signal S5 supplied from a drive circuit 5, converts the voltage supplied via a input circuit 1 to switching output, and outputs that switching output. An output circuit 3 is supplied with the switching output, adjusts the supplied switching output to a prescribed output, and outputs that prescribed output. A control circuit 4 supplies a control signal S4 to the drive circuit 5. An over-temperature protection circuit 6 comprises a temperature detector 61 and a switch 62, and is connected to the control electrode of the switching element 21, and cuts off the drive signal S5 via the switch 62 when the temperature detector 61 detects an abnormal temperature in the switching power supply apparatus.

28 Claims, 4 Drawing Sheets

SWITCHING POWER SUPPLY APPARATUS WITH OVER-TEMPERATURE PROTECTION

BACKGROUND OF THE INVENTION

1. Field of the Invention

The present invention relates to a switching power supply apparatus comprising an over-temperature protection circuit.

2. Description of the Related Art

A switching power supply apparatus comprises heat generating electronic parts such as switching elements in the interior, and radiates generated heat from the electronic parts via a radiator portion to prevent an abnormal temperature rise of the power supply apparatus. Also, a switching power supply apparatus is configured so that an over-temperature protection function acts to stop the operation of the power supply apparatus when the temperature of the power supply apparatus rises to an abnormal level due to an overload or other cause.

In switching power supply apparatuses, the computerization of the control systems has advanced in recent years, and devices such as special-purpose or general-purpose control integrated circuits or microprocessors are being used to control switching power supply apparatuses. In addition, switching power supply apparatuses have been made increasingly more compact and the integration of semiconductor elements for power conversion circuits, which are thermal and noise sources, has advanced so that the concentration of heat sources cannot be avoided. As a result, the over-temperature protection function in a switching power supply apparatus, which operates when the temperature of the power supply apparatus rises to an abnormal level, has become an extremely important element from a power supply performance standpoint.

Generally, the over-temperature protection function is implemented so that a control circuit constituted of the above-described various kinds of control system devices performs a protection operation by outputting a signal such as an operation stop signal according to a temperature detected by a temperature detection element. With this kind of conventional over-temperature protection method depending on a control circuit, when an abnormal temperature rise is detected while the power supply apparatus is operating, the over-temperature protection function usually operates because the control circuit is operating normally.

However, if a problem occurs in the control circuit for some reason, the certainty of the operation of the over-temperature protection is lost, and when the over-temperature protection function does not operate, the temperature of the power supply apparatus may rise until it significantly exceeds the stipulated value and the device is finally damaged. Consequently, it may be a problem that the over-temperature protection function, which operates when the temperature of the power supply apparatus rises to an abnormal level, depends only on an ordinary control circuit.

Switching power supply apparatuses are used as the power supplies of various kinds of electronic or electrical devices. For example, a switching power supply apparatus for lighting a discharge lamp generates a high pulse voltage. The pulse voltage generates electrical and magnetic noise, which may cause misoperation of the control circuit. Consequently, a means for protecting the power supply apparatus against an abnormal temperature rise when a problem occurs in the control circuit is required, considering the safety of the final manufactured product.

SUMMARY OF THE INVENTION

An object of the present invention is to provide a switching power supply apparatus equipped with an over-temperature protection circuit that operates appropriately even when a problem occurs in the control circuit.

Another object of the present invention is to provide a switching power supply apparatus equipped with an over-temperature protection circuit that is resistant to the effects of noise.

Still another object of the present invention is to provide a switching power supply apparatus equipped with a highly reliable over-temperature protection circuit that has a simple circuit configuration and operates dependably.

To achieve the above-described objects, a switching power supply apparatus of the present invention comprises an input circuit, a switching conversion circuit, a drive circuit, a control circuit, an output circuit and an over-temperature protection circuit.

The switching conversion circuit comprises a switching element having a control electrode, converts a voltage supplied via the input circuit to switching output and outputs that switching output.

The drive circuit supplies a drive signal to the switching element to turn the switching element on and off. The control circuit supplies a control signal to the drive circuit.

The output circuit is supplied with the switching output, adjusts the switching output to a prescribed output and outputs that prescribed output.

The over-temperature protection circuit comprises a temperature detector and a switch, and is connected to the control electrode of the switching element, and cuts off the drive signal via the switch when the temperature detector detects an abnormal temperature in the switching power supply apparatus.

In the switching power supply apparatus described above, the switching conversion circuit comprises a switching element having a control electrode, converts a voltage supplied via the input circuit to switching output and outputs that switching output, as the switching element is turned on and off according to a drive signal supplied from the drive circuit.

Since the switching output is supplied to the output circuit, which adjusts the switching output to a prescribed output and outputs that prescribed output, the supplied voltage can be adjusted to a prescribed output according to the load connected to the switching power supply apparatus and a suitable output can be supplied for the load.

The control circuit supplies a control signal to the drive circuit. The over-temperature protection circuit comprises a temperature detector and a switch, and is connected to the control electrode of the switching element, and cuts of f the drive signal via the switch when the temperature detector detects an abnormal temperature in the switching power supply apparatus. Therefore, the on-off operation of the switching element is stopped and hence, a further temperature rise in the switching power supply apparatus can be prevented.

In this way, the switching power supply apparatus of the present invention can make the over-temperature protection circuit operate appropriately even when a problem occurs in the control circuit since the drive signal is cut off directly via the switch, not via the control circuit, when the temperature detector detects an abnormal temperature in the switching power supply apparatus.

Also, since the wiring from the temperature detector to the control circuit, which had been required by a conventional over-temperature protection circuit, is unnecessary in the switching power supply apparatus of the present invention, the switching power supply apparatus can be made more compact, and the elimination of the wiring from the temperature detector to the control circuit can reduce the effect of noise that had been impressed on the control circuit via the wiring.

In addition, the over-temperature protection circuit of the switching power supply apparatus of the present invention can be considered a highly reliable over-temperature protection circuit that has a simple circuit configuration and operates dependably because the over-temperature protection circuit comprises the temperature detector and the switch, and the drive signal is cut off directly via the switch, not via the control circuit, when the temperature detector detects an abnormal temperature in the switching power supply apparatus.

Further objects, the configuration, and advantages of the present invention are described in detail with reference to the supplied figures. However, the supplied figures are nothing more than simple examples.

DESCRIPTION OF THE PREFERRED EMBODIMENTS

Figure 1:
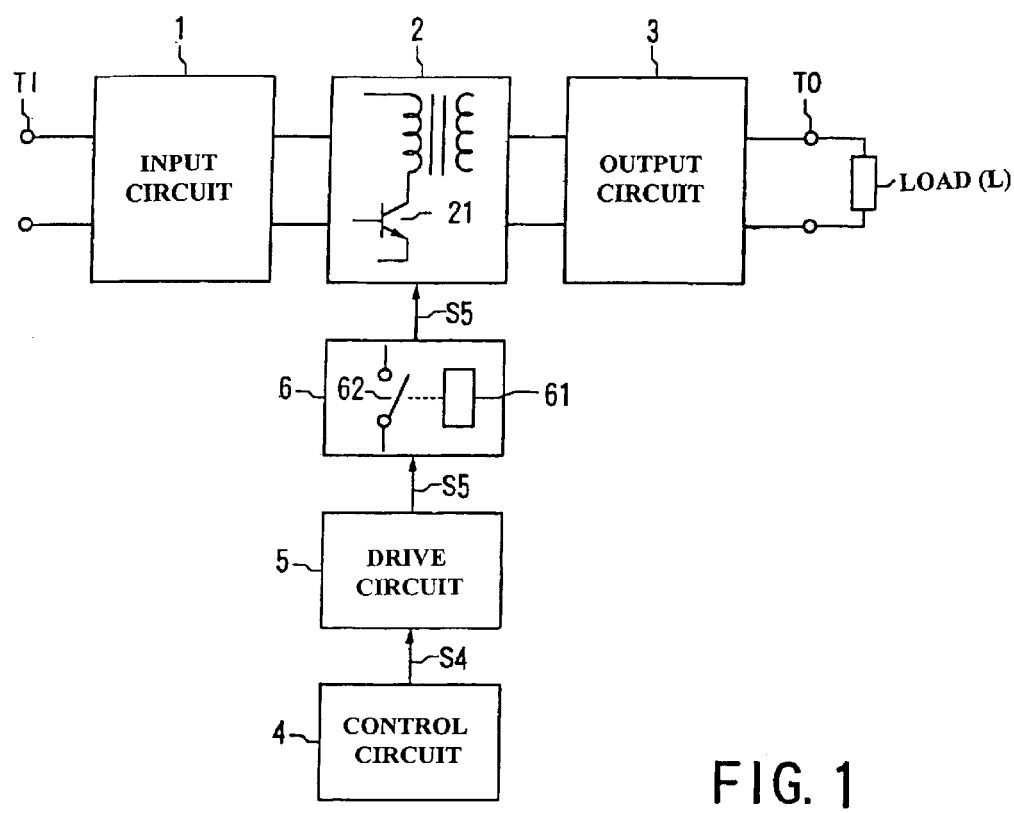
FIG. 1 is a circuit block diagram showing an embodiment of the switching power supply apparatus of the present invention.

Referring to FIG. 1, the switching power supply apparatus shown in the figure comprises an input circuit 1, a switching conversion circuit 2, an output circuit 3, a control circuit 4, a drive circuit 5, and an over-temperature protection circuit 6. TI is an input terminal, and TO is an output terminal. Alternating voltage or direct voltage is supplied to the input terminal TI. The alternating voltage may be commercial alternating voltage or other alternating voltage. Also, the direct voltage may be either from a battery, other direct voltage source, or alternating voltage that was converted to direct current via a rectifying and smoothing circuit.

The input circuit 1 adjusts the supplied alternating voltage or direct voltage to a suitable voltage for the switching conversion circuit 2. Although the input circuit 1 can be formed by circuit elements such as a choke coil or capacitor, for example, it need not comprise these elements and may comprise the abovementioned input terminal TI or the abovementioned rectifying and smoothing circuit or a filter circuit.

The switching conversion circuit 2 comprises a switching element 21 having a control electrode, converts the voltage supplied via the input circuit 1 to switching output by the on-off operation of the switching element 21, and outputs that switching output. One or more semiconductor elements such as bipolar transistors or field effect transistors are typically used for switching element 21, which should be able to switch the supplied voltage at a high frequency. The switching conversion circuit 2 may additionally comprise electromagnetic conversion elements such as transformers or choke coils. Specifically, converters publicly known as forward converters, flyback converters, or chopper converters may be constituted of single switching element converters or multi switching element converters such as push-pull, half-bridge or full-bridge converters.

The output circuit 3 is supplied with the above-mentioned switching output from the switching conversion circuit 2, adjusts the supplied switching output to a prescribed output suitable for load L and outputs that prescribed output. This output, which becomes the output of the switching power supply apparatus, is supplied to the load L. If the output supplied to the load L is a direct current, the output circuit 3 can be equipped with a circuit for rectifying and smoothing the supplied switching output. If the output supplied to the load L is an alternating current or a pulsating current, the output circuit 3 can be equipped with a circuit for adjusting the waveform and can also comprise the abovementioned output terminal TO.

The control circuit 4 supplies a control signal S4 to the drive circuit 5 so that the output of the switching power supply apparatus will be appropriate for the load L. The drive circuit 5 supplies a drive signal S5 to the control electrode of the switching element 21 based on the control signal S4, and controls on-off operation of the switching element 21. The control circuit 4, which can comprise devices such as special-purpose or general-purpose integrated circuits or microprocessors, detects the input or output current or voltage as necessary to control on-off operation of the switching element 21.

The over-temperature protection circuit 6 comprises a temperature detector 61 and a switch 62. The temperature detector 61 can be formed by elements in which the electrical state changes according to temperature, such as PTC or NTC thermistors or thermostats, for example. The temperature detector 61 is placed at a location where it can detect the temperature of the switching power supply apparatus or the temperature of heat generating electronic components. For example, the temperature detector 61 can be attached in the vicinity of the switching element 21, or be attached so that it is thermally coupled to the heat radiating member of the switching element 21. There may be more than one temperature detector 61.

The switch 62 should be an element that responds to an electrical signal from the thermal detector 61 to change its closed or open state, and a semiconductor element such as a bipolar transistor, field effect transistor, or thyristor is suitable, and a mechanical switch such as a relay can also be used.

In addition, if over-temperature protection circuit 6 is formed by a thermostat, the temperature detector 61 and the switch 62 can be configured in a single element.

The switch 62 of the over-temperature protection circuit 6 is connected to the control electrode of the switching element 21 and operates to cut off the drive signal S5 when the temperature detector 61 detects an abnormal temperature in the switching power supply apparatus. After the drive signal S5 is cut off, it may return either automatically following the temperature drop of the switching power supply apparatus, or manually by a reset operation. Although one switch 62 is normally paired with one switching element 21, this is not necessarily required, and a switch 62 may be installed only for a representative switching element 21. Also, like the temperature detector 61, when a plurality of switches 62 are installed, they may be configured so that all switches 62 operate when a single temperature detector 61 detects an abnormal temperature.

The configuration of the closed and open states of the switch 62 may take either a so-called normally-short configuration or normally-open configuration. With a normally-short configuration, the switch 62 is inserted in the signal line of the drive signal S5, and is kept closed during normal operation, and is turned to an open state to cut off the drive signal S5 when an abnormal temperature is detected.

With a normally-open configuration, the switch 62 is connected to the drive signal input ends of the switching element 21, and is kept open during normal operation, and is turned to a closed state to create a short circuit between the drive signal input ends of the switching element 21 and cut off the drive signal S5 when an abnormal temperature is detected.

There is a risk that an arc may be generated with a normally-short configuration because the drive signal S5, which had been supplied during normal operation, is cut off by opening the switch 62. Therefore, a normally-open configuration is more suitable because there is no risk of an arc being generated.

In the switching power supply apparatus described above, the input voltage supplied to the input terminal TI is supplied via the input circuit 1 to the switching conversion circuit 2. The switching conversion circuit 2 comprises a switching element 21 having a control electrode, and switches the supplied voltage according to the on-off operation of the switching element 21. The switching operation of the switching element 21 is controlled by the control circuit 4. The control circuit 4 supplies the control signal S4 to the drive circuit 5 so that the output of the switching power supply apparatus is suitable for the load L. Since the drive circuit 5 supplies the drive signal S5 to the control electrode of the switching element 21 based on the control signal S4 to control the on-off operation of the switching element 21, a controlled switching output is supplied to the output circuit 3. Since the output circuit 3 adjusts the switching output supplied from the switching conversion circuit 2 to a prescribed output suitable for the load L and outputs that prescribed output, the prescribed output becomes the output of the switching power supply apparatus and is supplied to the load L.

Assume here that the temperature of the switching power supply apparatus rises to an abnormal temperature due to a load fluctuation, control circuit problem, or other cause. When this occurs, the temperature detector 61 of the over-temperature protection circuit 6 detects the abnormal temperature. Since the switch 62 of the over-temperature protection circuit 6 operates when the temperature detector 61 detects the abnormal temperature, the drive signal S5 is cut off. If the configuration of the closed and open states of the switch 62 is a normally-short configuration, the switch 62 is turned to an open state to cut of f the drive signal S5. If the configuration of the closed and open states of the switch 62 is a normally-open configuration, the switch 62 is turned to a closed state to create a short circuit between the drive signal input ends of the switching element 21 and cut off the drive signal S5. As a result, the on-off operation of switching element 21 is stopped, and hence a further temperature rise in the switching power supply apparatus can be prevented. In this way, the drive signal S5 is cut off directly via the switch 62, not via the control circuit 4 when the temperature detector 61 detects an abnormal temperature in the switching power supply apparatus. Hence, the switching power supply apparatus of the present invention can make the over-temperature protection circuit 6 operate even when a problem occurs in the control circuit 4.

Also, since the wiring from the temperature detector to the control circuit, which had been required by a conventional over-temperature protection circuit, is unnecessary in the switching power supply apparatus of the present invention, the switching power supply apparatus can be made more compact, and the elimination of the wiring from the temperature detector 61 to the control circuit 4 can reduce the effect of noise that had been impressed on the control circuit via the abovementioned wiring.

In addition, the over-temperature protection circuit 6 of the switching power supply apparatus of the present invention can be considered a highly reliable over-temperature protection circuit that has a simple circuit configuration and operates dependably because the over-temperature protection circuit 6 comprises the temperature detector 61 and the switch 62, and the drive signal S5 is cut off directly via switch 62, not via control circuit 4, when the temperature detector 61 detects an abnormal temperature in the switching power supply apparatus.

Figure 2:
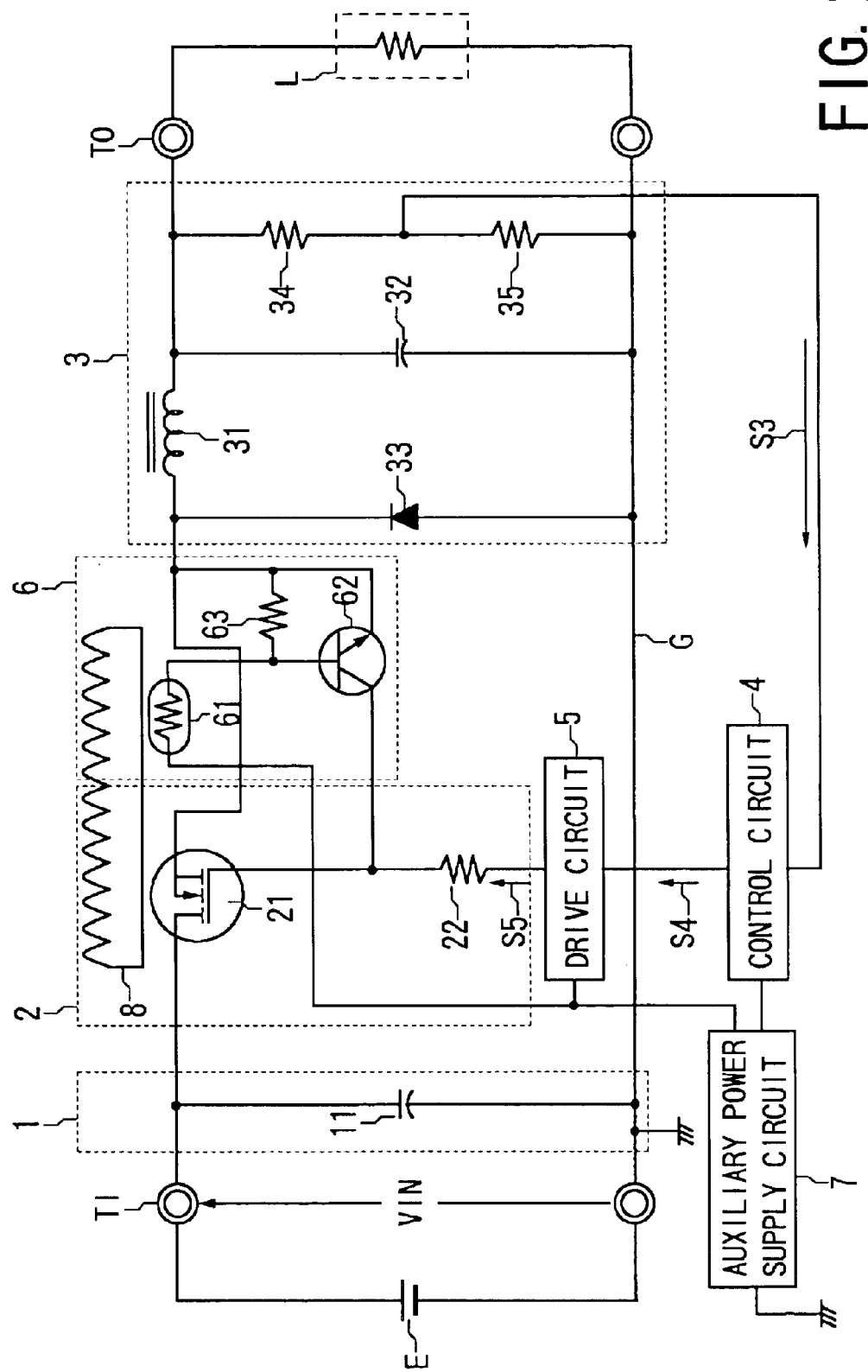
FIG. 2 is an electrical circuit diagram showing another embodiment of the switching power supply apparatus of the present invention.

FIG. 2 is an electrical circuit diagram showing another embodiment of the switching power supply apparatus of the present invention. The switching power supply apparatus shown in the figure is an example of a step-down chopper-type converter using a choke coil. In this figure, the same reference numbers have been assigned for the same components as the ones shown in FIG. 1.

The switching power supply apparatus shown in the figure comprises an input circuit 1, a switching conversion circuit 2, an output circuit 3, a control circuit 4, a drive circuit 5, an over-temperature protection circuit 6, and an auxiliary power supply circuit 7. An direct voltage source E is connected to input terminal TI.

The input circuit 1 comprises an input capacitor 11. One end of the input capacitor 11 is connected to both of the input terminal TI and the switching conversion circuit 2. The other end of the input capacitor 11 is connected to the input/output common ground line G.

The switching conversion circuit 2 comprises a switching element 21. The switching element 21 is formed by a field effect transistor and is attached to a heat radiating member 8. The drain electrode of the switching element 21 is connected to one end of the input capacitor 11, the source electrode is connected to the output circuit 3, and the gate electrode is connected via a gate resistor 22 to the drive circuit 5. The switching conversion circuit 2 switches direct voltage VIN, which is supplied via the input circuit 1, according to the switching element 21 to supply switching output to the output circuit 3.

The output circuit 3 comprises a choke coil 31, a smoothing capacitor 32, a rectifying diode 33, and resistors 34 and 35. One end of the choke coil 31 is connected to the source electrode of the switching element 21, and the other end is connected to one end of the output terminal TO. The smoothing capacitor 32, which is connected to the other end of the choke coil 31 and the ground line G, is charged by the voltage supplied via the choke coil 31 for the period when the switching element 21 is on. The rectifying diode 33, which is connected to one end of the choke coil 31 and the ground line G, is oriented so that the energy that had been stored in the choke coil 31 is discharged for the period when the switching element 21 is off. A synchronous rectifying element may be configured if an element having a control electrode, such as a transistor, is used instead of the rectifying diode 33. The resistors 34 and 35 are connected in series, that series circuit is connected to both ends of the smoothing capacitor 32 to divide the output voltage, and the divided voltage is supplied to the control circuit 4 as an output voltage signal S3.

The control circuit 4 supplies a control signal S4 to the drive circuit 5 based on the output voltage signal S3 or another detection signal, which is not shown in the figure.

The drive circuit 5 supplies a drive signal S5 to the control electrode of the switching element 21 based on the control signal S4 to control the on-off operation of the switching element 21.

The auxiliary power supply circuit 7 supplies operating power to the control circuit 4, the drive circuit 5, and the over-temperature protection circuit 6.

The over-temperature protection circuit 6 comprises a temperature detector 61 formed by an NTC thermistor, a switch 62 formed by a transistor, and an emitter resistor 63. The temperature detector 61, which is attached so that it is thermally coupled to the heat radiating member 8 to which the switching element 21 is attached, detects the temperature of the switching element 21. The switch 62 is formed by a transistor in which the collector is connected to the gate electrode of switching element 21 and the emitter is connected to the source electrode of the switching element 21 to constitute a normally-open configuration. The base of the switch 62 is connected both to the auxiliary power supply circuit 7 via the temperature detector 61, which is formed by an NTC thermistor, and to the emitter via the emitter resistor 63.

In the switching power supply apparatus described above, if the temperature of the switching element 21 is in a steady state, the temperature of the temperature detector 61, which is formed by an NTC thermistor, is also low, and its resistance value is in a high-resistance state. As a result, the base current supplied to the base of the transistor constituting the switch 62 from the auxiliary power supply circuit 7 via the temperature detector 61 is limited and hence, the transistor is off, which causes the switch 62 to be open. Therefore, since the gate-to-source connection of the switching element 21 is open, the switching element 21 performs the on-off operation according to the supplied drive signal S5.

The switching conversion circuit 2 switches direct voltage VIN, which is supplied via the input circuit 1, according to the on-off operation of the switching element 21 to supply switching output to the output circuit 3. The switching output supplied for the period when the switching element 21 is on flows via the choke coil 31 to excite the choke coil 31, charge the smoothing capacitor 32, and be supplied to the load L. The excitation energy that had been stored in the choke coil 31 is discharged via the rectifying diode 33 for the period when the switching element 21 is off. The control circuit 4 supplies the control signal S4 to the drive circuit 5 based on the output voltage signal S3 or another detection signal, which is not shown in the figure. The drive circuit 5 supplies the drive signal S5 to the control electrode of the switching element 21 based on the control signal S4 to control the on-off operation of the switching element 21. As a result, a prescribed direct voltage is supplied to the load L.

Assume here that the temperature of the switching element 21 rises to an abnormal temperature due to a load fluctuation, control circuit problem, or other cause. When this occurs, the temperature of the temperature detector 61 of the over-temperature protection circuit 6, which is attached so that it is thermally coupled to the heat radiating member 8 to which the switching element 21 is attached, also rises.

The temperature detector 61, which is formed by an NTC thermistor, detects an abnormal temperature due to the drop in its resistance value as the temperature rises. When the resistance value of the NTC thermistor drops, the base current supplied from the auxiliary power supply circuit 7 to the base of the transistor forming the switch 62 increases and hence, the transistor is turned on to close the switch 62. As a result, a short circuit occurs between the gate and source of the switching element 21 and hence, the drive signal S5, which was being supplied to the switching element 21, is cut off to stop the operation of the switching element 21.

Later, when the temperature of the switching element 21 drops, the temperature of the temperature detector 61, which is formed by an NTC thermistor, also drops, and when the resistance value of the NTC thermistor increases, the base current supplied from the auxiliary power supply circuit 7 to the base of the transistor forming the switch 62 decreases and hence, the transistor is turned off to open the switch 62. As a result, the connection between the gate and source of the switching element 21 is opened and hence, the drive signal S5 is supplied to the switching element 21 again to automatically restore the operation of the switching element 21.

In the present embodiment, although the temperature detector 61 is attached so that it is thermally coupled to the heat radiating member 8 to which the switching element 21 is attached, it is not limited to the neighborhood of the switching element 21, but may also be attached in the neighborhood of other electronic components associated with heat generation, or it may be configured so that it can detect the temperature of any component of the switching power supply apparatus. Also, it may be configured so as to have hysteresis between the operation stopping temperature and the operation restarting temperature of the switching element 21, it may be configured with a normally-short configuration, and it may be configured so that a reset circuit is added for manually returning to normal operation.

In addition, the switching power supply apparatus may comprise a plurality of switching elements 21 and may be configured, for example, so that the control electrodes of the plurality of switching elements 21 are each connected to switches 62, and the drive signals supplied to the plurality of switching elements 21 via each of the corresponding switches 62 are cut off when a single temperature detector 61 detects an abnormal temperature.

Figure 3:
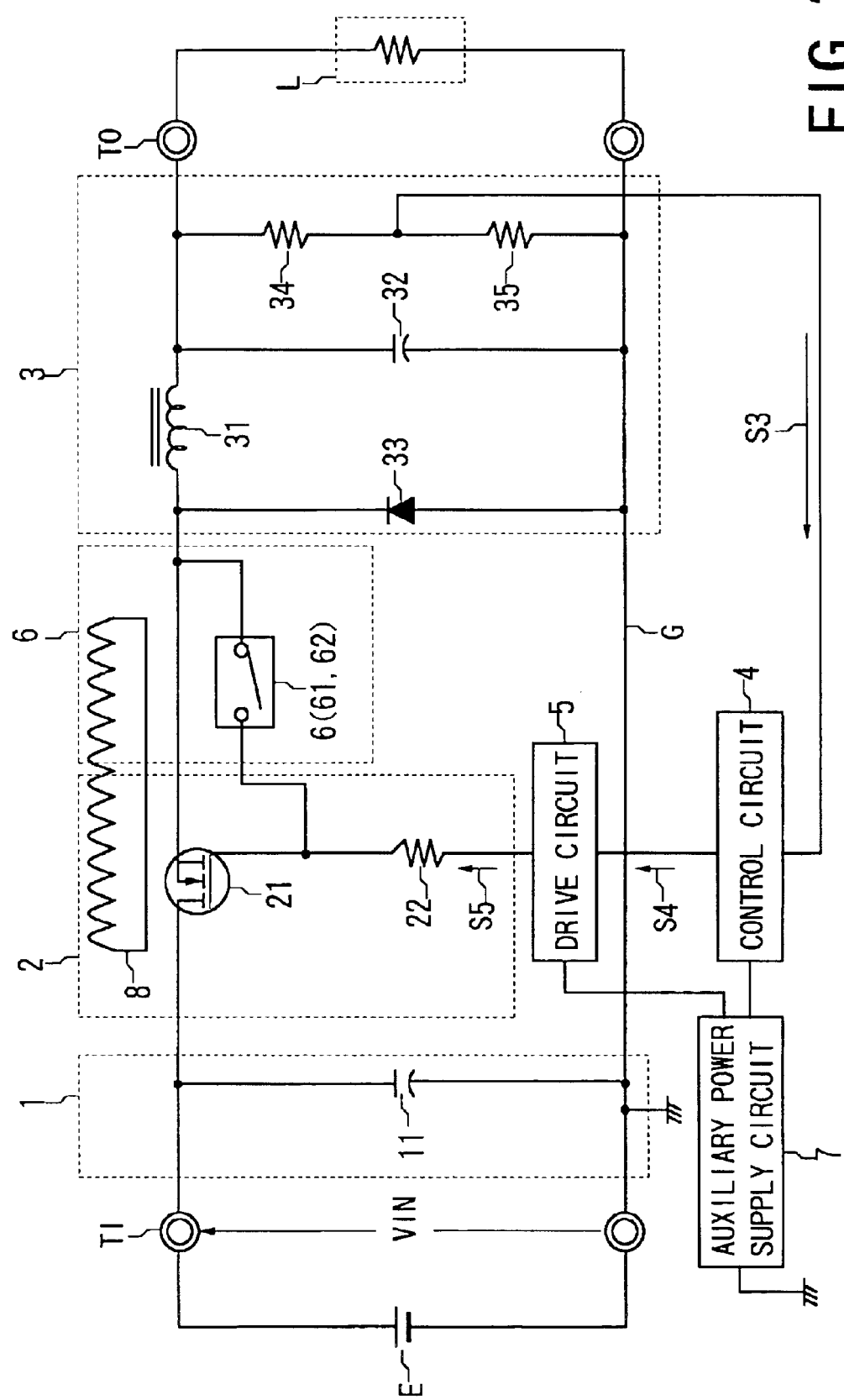
FIG. 3 is an electrical circuit diagram showing still another embodiment of the switching power supply apparatus of the present invention.

FIG. 3 is an electrical circuit diagram showing still another embodiment of the switching power supply apparatus of the present invention. In this figure, the same reference numbers have been assigned for the same components as the ones shown in FIG. 2. The switching power supply apparatus shown in the figure comprises an input circuit 1, a switching conversion circuit 2, an output circuit 3, a control circuit 4, a drive circuit 5, and an over-temperature protection circuit 6.

In the switching power supply apparatus shown in the figure, the configuration of the over-temperature protection circuit 6 differs from that of the switching power supply apparatus shown in FIG. 2, and the configurations of the input circuit 1, the switching conversion circuit 2, the output circuit 3, the control circuit 4, and the drive circuit 5 are the same as those of the switching power supply apparatus shown in FIG. 2. The following is an explanation of the over-temperature protection circuit 6, which has a different configuration, and explanations of components that are the same are omitted.

The over-temperature protection circuit 6 of the present embodiment is formed by a thermostat. A thermostat is an element that attains a prescribed temperature as a threshold value by switching between closed and open states. As a result, the temperature detector 61 and switch 62 can be configured in a single element. In the switching power supply apparatus of the present embodiment, the over-temperature protection circuit 6, which is formed by a thermostat, is attached so that it is thermally coupled to the heat radiating member 8 to which the switching element 21 is attached, in a similar manner as in the switching power supply apparatus shown in FIG. 2, and is connected to the gate electrode and the source electrode of the switching element 21. A connection with the auxiliary power supply circuit 7 is unnecessary. The thermostat used in the present embodiment is configured with a normally-open configuration in which the switch is open when its temperature is steady and the switch turns to a closed state when the temperature rises to an abnormal temperature.

In the switching power supply apparatus described above, if the temperature of the switching element 21 is in a steady state, the temperature of the temperature detector 61, which is formed by a thermostat, is also low, and the switch 62 is in an open state. Therefore, since the gate-to-source connection of the switching element 21 is open, the switching element 21 performs the on-off operation according to the supplied drive signal S5, and a prescribed direct voltage is supplied to the load L.

Assume here that the temperature of the switching element 21 rises to an abnormal temperature due to a load fluctuation, control circuit problem, or other cause. When this occurs, the temperature of the temperature detector 61 of the over-temperature protection circuit 6, which is attached so that it is thermally coupled to the heat radiating member 8 to which the switching element 21 is attached, also rises. The over-temperature protection circuit 6, which is formed by a thermostat, comprises the temperature detector 61 and the switch 62 in a single element. Therefore, the switch 62 switches to a closed state at the same time that the temperature detector 61 detects an abnormal temperature. As a result, a short circuit occurs between the gate and source of the switching element 21 and hence, the drive signal S5, which was being supplied to the switching element 21, is cut off to stop the operation of the switching element 21.

Later, when the temperature of the switching element 21 drops, the temperature of the temperature detector 61, which is formed by a thermostat, also drops, so that the thermostat turns to an open state to open the switch 62. As a result, the connection between the gate and source of the switching element 21 is opened and hence, the drive signal S5 is supplied to the switching element 21 again to automatically restore the operation of the switching element 21.

In the present embodiment, although the temperature detector 61 is attached so that it is thermally coupled to the heat radiating member 8 to which the switching element 21 is attached, it is not limited to the neighborhood of the switching element 21, but may also be attached in the neighborhood of other electronic components associated with heat generation, or it may be configured so that it can detect the temperature of any component of the switching power supply apparatus. Also, it may be configured so as to have hysteresis between the operation stopping temperature and the operation restarting temperature of the switching element 21, it may be configured with a normally-short configuration, and it may be configured so that a reset circuit is added for manually returning to normal operation, in a similar manner as for the embodiment shown in FIG. 2. In addition, since the thermostat can be configured with the temperature detector 61 and switch 62 as a single element, the configuration of the temperature detector 61 is extremely simple.

Figure 4:
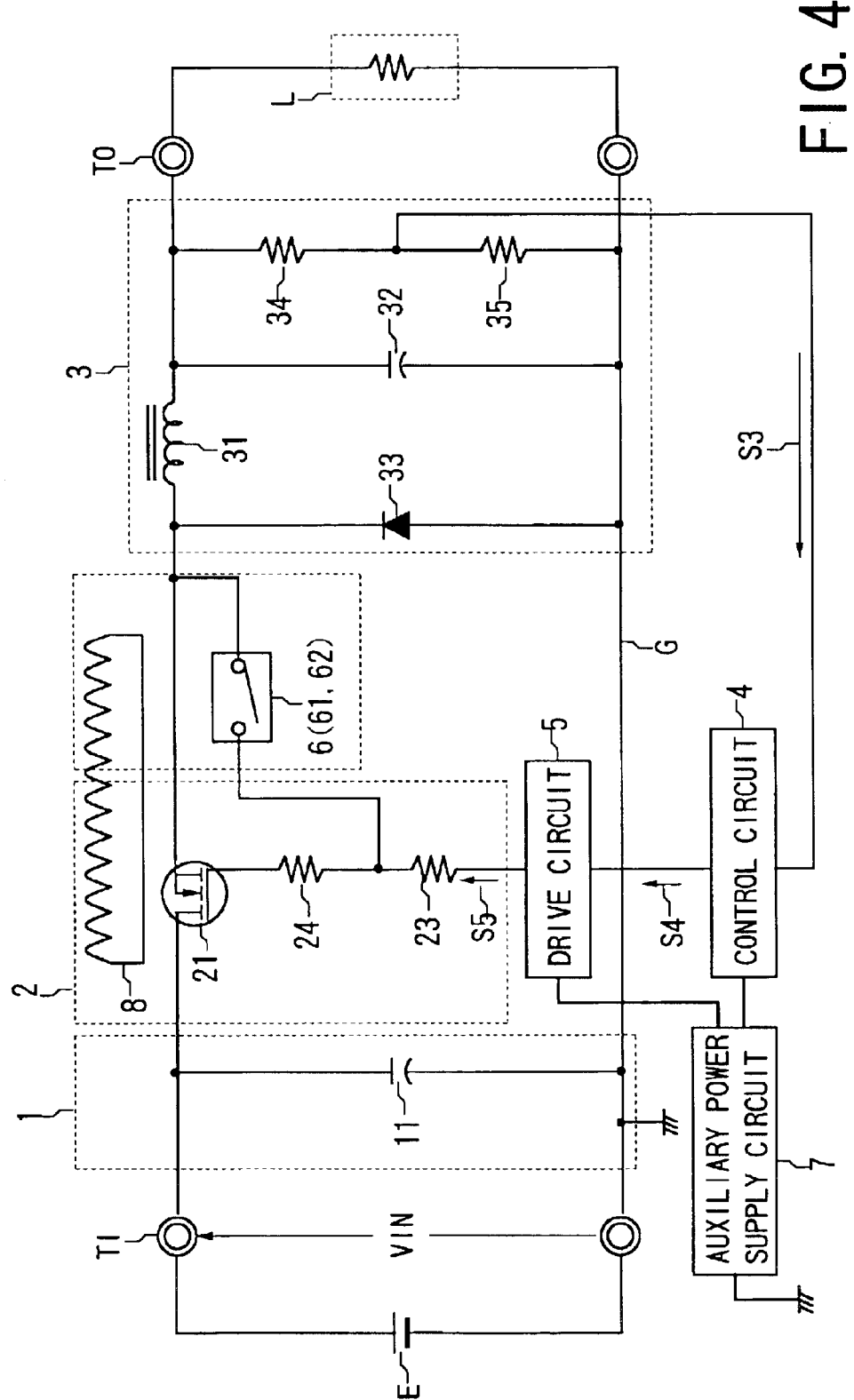
FIG. 4 is an electrical circuit diagram showing still another embodiment of the switching power supply apparatus of the present invention.

FIG. 4 is an electrical circuit diagram showing still another embodiment of the switching power supply apparatus of the present invention. In this figure, the same reference numbers have been assigned for the same components as the ones shown in FIG. 3. The switching power supply apparatus shown in the figure comprises an input circuit 1, a switching conversion circuit 2, an output circuit 3, a control circuit 4, a drive circuit 5, and an over-temperature protection circuit 6. Except for the different connection configuration between the gate resistor of the switching element 21 and the over-temperature protection circuit 6, the switching power supply apparatus shown in the figure is similar to the switching power supply apparatus shown in FIG. 3. The following is an explanation of the connection configuration between the gate resistor and the over-temperature protection circuit 6, and explanations of components that are the same are omitted.

The gate resistor of the switching element 21 of the present embodiment has been divided into two resistors comprising gate resistors 23 and 24. Although the over-temperature protection circuit 6 is formed by a thermostat with a normally-open configuration in a similar manner as in the switching power supply apparatus shown in FIG. 3, the connection points differ in that the over-temperature protection circuit 6 is connected to the connection points of the gate resistors 23 and 24 and the source electrode of the switching element 21.

When the temperature of the switching element 21, in a similar manner as in the switching power supply apparatus shown in FIG. 3, rises to an abnormal temperature, the switch 62 switches to a closed state at the same time that the temperature detector 61 detects an abnormal temperature. At this time, a short circuit occurs between the gate and source of the switching element 21, and the inrush current from the gate capacitance of the switching element 21 flows via the switch 62, namely, the thermostat. With the switching power supply apparatus of the present embodiment, the inrush current from this gate capacitance flows via the gate resistor 24. At this time, the gate resistor 24 functions as a current limiting resistor. As a result, since the inrush current from the gate capacitance is reduced, the reliability of the thermostat can be increased in the switching power supply apparatus of the present invention.

Although the present invention was described in detail above with reference to acceptable embodiments, the present invention is not limited to these embodiments, and it is self-evident that relevant companies can think of various kinds of modifications based on the basic technical ideas and teachings of the present invention.

As described above, the following results can be obtained by using the present invention.

(A) A switching power supply apparatus equipped with an over-temperature protection circuit that operates appropriately even when a problem occurs in the control circuit can be provided.

(B) A switching power supply apparatus equipped with an over-temperature protection circuit that is resistant to the effects of noise can be provided.

(C) A switching power supply apparatus equipped with a highly reliable over-temperature protection circuit that has a simple circuit configuration and operates dependably can be provided.

What is claimed is:

1. A switching power supply apparatus comprising an input circuit, a switching conversion circuit, a drive circuit, a control circuit, an output circuit, and an over-temperature protection circuit wherein;

said switching conversion circuit comprises a switching element having a control electrode, converts an input voltage supplied by said input circuit to a switching output, and outputs said switching output;

said drive circuit supplies a drive signal to said switching element to turn the switching element on and off;

said control circuit supplies a control signal to said drive circuit, based on an output signal from said output circuit;

said output circuit including a choke coil, a smoothing capacitor, a rectifying element, and first and second resistors connected in series to opposing ends of said smoothing capacitor, wherein when said switching element is on, said switching output excites said choke coil and charges said smoothing capacitor, which adjust said switching output to a prescribed output that is supplied to a load and said first and second resistors, said first and second resistors dividing a voltage of said prescribed output and supplying said divided output as said output signal to said control circuit, and when said switching element is off, excitation energy stored in said choke coil is discharged by said rectifying element; and said over-temperature protection circuit comprises a temperature detector and a switch, and is connected to the control electrode of said switching element, and cuts off said drive signal via said switch when said temperature detector detects an abnormal temperature in said switching power supply apparatus.

2. The switching power supply apparatus according to claim 1, wherein;

said temperature detector detects the temperature of said switching element.

3. The switching power supply apparatus according to claim 2, wherein;

said switching element is attached to a heat radiating member; and said temperature detector is attached to said heat radiating member.

4. The switching power supply apparatus according to claim 3, wherein;

said switch is connected to a drive signal input of said switching element, and turns to a closed state to short-circuit the drive signal input of said switching element when said temperature detector detects an abnormal temperature in said switching power supply apparatus.

5. The switching power supply apparatus according to claim 4, wherein;

said switching element comprises a field effect transistor, the control electrode of which is connected to a series circuit comprising a plurality of gate resistors; and said switch is connected to the drive signal input of said switching element with some of said plurality of gate resistors interposed therebetween.

6. The switching power supply apparatus according to claim 2, wherein;

said switch is connected to a drive signal input of said switching element, and turns to a closed state to short-circuit the drive signal input of said switching element when said temperature detector detects an abnormal temperature in said switching power supply apparatus.

7. The switching power supply apparatus according to claim 6, wherein;

said switching element comprises a field effect transistor, the control electrode of which is connected to a series circuit comprising a plurality of gate resistors; and said switch is connected to the drive signal input of said switching element with some of said plurality of gate resistors interposed therebetween.

8. The switching power supply apparatus according to claim 1, wherein;

said switch is connected to a drive signal input of said switching element, and turns to a closed state to short-circuit the drive signal input of said switching element when said temperature detector detects an abnormal temperature in said switching power supply apparatus.

9. The switching power supply apparatus according to claim 8, wherein;

said switching element comprises a field effect transistor, the control electrode of which is connected to a series circuit comprising a plurality of gate resistors; and said switch is connected to the drive signal input of said switching element with some of said plurality of gate resistors interposed therebetween.

10. The switching power supply apparatus according to claim 1, further comprising a resistance element arranged between said control electrode of said switching element and a source of said switch of said over-temperature protection circuit, wherein, when said drive signal is cut off by said switch, said resistance element protects said over-temperature protection circuit from a surge in current that flows from a gate capacitance of said switching element.

11. The switching power supply apparatus of claim 1, wherein said over-temperature protection circuit cuts off said drive signal via said switch when said temperature detector detects an abnormal temperature of a component other than said switching element and other than another component of said switching conversion circuit.

12. A switching power supply apparatus comprising a heat radiating member, an input circuit, a switching conversion circuit, a drive circuit, a control circuit, an output circuit, and an over-temperature protection circuit, wherein;

said switching conversion circuit comprises a field effect transistor attached to said heat radiating member, converts an input voltage supplied by said input circuit to a switching output and outputs said switching output;

said drive circuit supplies a drive signal to the gate electrode of said field effect transistor to turn said field effect transistor on and off;

said control circuit supplies a control signal to said drive circuit;

said output circuit including a choke coil, a smoothing capacitor, a rectifying element, and first and second resistors connected in series to opposing ends of said smoothing capacitor, wherein when said switching element is on, said switching output excites said choke coil and charges said smoothing capacitor, which adjust said switching output to a prescribed output that is supplied to a load and said first and second resistors, said first and second resistors dividing a voltage of said prescribed output and supplying said divided output as said output signal to said control circuit, and when said switching element is off, excitation energy stored in said choke coil is discharged by said rectifying element;

said over-temperature protection circuit comprises a thermostat; and said thermostat is attached to said heat radiating member so as to detect an abnormal temperature of said field effect transistor, and is connected to the gate electrode and the source electrode of said field effect transistor so that said thermostat creates a short-circuit between the gate electrode and the source electrode of said field effect transistor to cut off said drive signal when said thermostat detects an abnormal temperature of said field effect transistor.

13. A switching power supply apparatus comprising an input circuit, a switching conversion circuit, a drive circuit, a control circuit, an output circuit, and an over-temperature protection circuit, wherein;

said switching conversion circuit comprises a switching element having a control electrode, converts an input voltage supplied by said input circuit to a switching output, and outputs said switching output;

said drive circuit supplies a drive signal to said switching element to turn the switching element on and off;

said control circuit supplies a control signal to said drive circuit, based on an output signal from said output circuit;

said output circuit including a choke coil, a smoothing capacitor, a rectifying element, and first and second resistors connected in series to opposing ends of said smoothing capacitor, wherein when said switching element is on, said switching output excites said choke coil and charges said smoothing capacitor, which adjust said switching output to a prescribed output that is supplied to a load and said first and second resistors, said first and second resistors dividing a voltage of said prescribed output and supplying said divided output as said output signal to said control circuit, and when said switching element is off, excitation energy stored in said choke coil is discharged by said rectifying element, and said over-temperature protection circuit comprises a temperature detector and a switch, and is connected to the control electrode of said switching element;

said temperature detector is attached to said heat radiating member and detects the temperature of said switching element;

said temperature detector and said switch are configured in a thermostat; and said over-temperature protection circuit cuts off said drive signal via said switch when said temperature detector detects an abnormal temperature in said switching power supply apparatus.

14. The switching power supply apparatus according to claim 13, wherein;

said switch is connected to a drive signal input of said switching element, and turns to a closed state to short-circuit the drive signal input of said switching element when said temperature detector detects an abnormal temperature in said switching power supply apparatus.

15. The switching power supply apparatus according to claim 14, wherein;

said switching element comprises a field effect transistor, the control electrode of which is connected to a series circuit comprising a plurality of gate resistors; and said switch is connected to the drive signal input of said switching element with some of said plurality of gate resistors interposed therebetween.

16. The switching power supply apparatus according to claim 13, further comprising a resistance element arranged between said control electrode of said switching element and a source of said switch of said over-temperature protection circuit, wherein, when said drive signal is cut off by said switch, said resistance element protects said over-temperature protection circuit from a surge in current that flows from a gate capacitance of said switching element.

17. The switching power supply apparatus of claim 13, wherein said over-temperature protection circuit cuts off said drive signal via said switch when said temperature detector detects an abnormal temperature of a component other than said switching element and other than another component of said switching conversion circuit.

18. A switching power supply apparatus comprising a heat radiating member, an input circuit, a switching conversion circuit, a drive circuit, a control circuit, an output circuit, and an over-temperature protection circuit, wherein;

said switching conversion circuit comprises a field effect transistor attached to said heat radiating member, converts an input voltage supplied by said input circuit to a switching output and outputs said switching output;

said drive circuit supplies a drive signal to the gate electrode of said field effect transistor to turn said field effect transistor on and off;

said control circuit supplies a control signal to said drive circuit;

said output circuit including a choke coil, a smoothing capacitor, a rectifying element, and first and second resistors connected in series to opposing ends of said smoothing capacitor, wherein when said switching element is on, said switching output excites said choke coil and charges said smoothing capacitor, which adjust said switching output to a prescribed output that is supplied to a load and said first and second resistors, said first and second resistors dividing a voltage of said prescribed output and supplying said divided output as said output signal to said control circuit, and when said switching element is off, excitation energy stored in said choke coil is discharged by said rectifying element;

said over-temperature protection circuit comprises a switch and an NTC thermistor; said switch has a control electrode and two main electrodes, and the two main electrodes are connected to the gate electrode and the source electrode of said field effect transistor; and said NTC thermistor is attached to said heat radiating member so as to detect an abnormal temperature of said field effect transistor, and is connected to the control electrode of said switch so that said NTC thermistor turns on said switch to cut off said drive signal when said NTC thermistor detects an abnormal temperature of said field effect transistor.

19. The switching power supply apparatus of claim 18, wherein said over-temperature protection circuit comprises another NTC thermistor that turns on said switch to cut off said drive signal when said another NTC thermistor detects an abnormal temperature of a component other than said field effect transistor and other than another component of said switching conversion circuit.

20. The switching power supply apparatus according to claim 18, wherein;

said NTC thermistor is connected to the control electrode of said switch so that a resistance value drop of said NTC thermistor turns on said switch when said NTC thermistor detects an abnormal temperature of said field effect transistor.

21. The switching power supply apparatus according to claim 20, wherein;

said resistance value drop of said NTC thermistor produces an increase in a signal supplied to the control electrode of said switch via said NTC thermistor, thereby turning on said switch.

22. The switching power supply apparatus according to claim 18, wherein;

said switch comprises a transistor having a base, a collector and an emitter, and one of the collector and emitter is connected to the gate electrode of said field effect transistor, the other is connected to the source electrode of said field effect transistor; and said NTC thermistor is connected to the base of said transistor.

23. The switching power supply apparatus according to claim 22, wherein;

said NTC thermistor is connected to the base of said transistor so that a resistance value drop of said NTC thermistor turns on said transistor when said NTC thermistor detects an abnormal temperature of said field effect transistor.

24. A switching power supply apparatus comprising an input circuit, a switching conversion circuit, a drive circuit, a control circuit, an output circuit and an over-temperature protection circuit, wherein;

said switching conversion circuit comprises a switching element having a control electrode, converts an input voltage supplied by said input circuit to a switching output, and outputs said switching output;

said drive circuit supplies a drive signal to said switching element to turn the switching element on and off;

said control circuit supplies a control signal to said drive circuit, based on an output signal from said output circuit;

said output circuit including a choke coil, a smoothing capacitor, a rectifying element, and first and second resistors connected in series to opposing ends of said smoothing capacitor, wherein when said switching element is on, said switching output excites said choke coil and charges said smoothing capacitor, which adjust said switching output to a prescribed output that is supplied to a load and said first and second resistors, said first and second resistors dividing a voltage of said prescribed output and supplying said divided output as said output signal to said control circuit, and when said switching element is off, excitation energy stored in said choke coil is discharged by said rectifying element, and said over-temperature protection circuit comprises a temperature detector and a switch, and is connected to the control electrode of said switching element;

said temperature detector comprises a thermistor and is attached to said heat radiating member and detects the temperature of said switching element;

said switch comprises a transistor that is turned on and off via said thermistor; and said over-temperature protection circuit cuts off said drive signal via said switch when said temperature detector detects an abnormal temperature in said switching power supply apparatus.

25. The switching power supply apparatus according to claim 16, further comprising a resistance element arranged between said control electrode of said switching element and a source of said switch of said over-temperature protection circuit, wherein, when said drive signal is cut off by said switch, said resistance element protects said over-temperature protection circuit from a surge in current that flows from a gate capacitance of said switching element.

26. The switching power supply apparatus of claim 24, wherein said over-temperature protection circuit cuts off said drive signal via said switch when said temperature detector detects an abnormal temperature of a component other than said switching element and other than another component of said switching conversion circuit.

27. The switching power supply apparatus according to claim 24, wherein;

said switch is connected to a drive signal input of said switching element, and turns to a closed state to short-circuit the drive signal input of said switching element when said temperature detector detects an abnormal temperature in said switching power supply apparatus.

28. The switching power supply apparatus according to claim 27, wherein;

said switching element comprises a field effect transistor, the control electrode of which is connected to a series circuit comprising a plurality of gate resistors; and said switch is connected to the drive signal input of said switching element with some of said plurality of gate resistors interposed therebetween.

* * * * *